United States Patent
Magnus et al.

(10) Patent No.: US 9,240,088 B1
(45) Date of Patent: Jan. 19, 2016

(54) NEGOTIABLE INSTRUMENT WITH DUAL-SIDED VARIABLE PRINTING

(71) Applicant: Harland Clarke Corp., San Antonio, TX (US)

(72) Inventors: Philip Magnus, Helotes, TX (US); Luis Sanchez, San Antonio, TX (US); Richard Ebrey, Damascus, MD (US); Daniel Hartlage, San Antonio, TX (US); Erik Mericle, Atlanta, GA (US); Daniel Castilleja, San Antonio, TX (US)

(73) Assignee: Harland Clarke Corp., San Antonio, TX (US)

( * ) Notice: Subject to any disclaimer, the term of this patent is extended or adjusted under 35 U.S.C. 154(b) by 0 days.

(21) Appl. No.: 14/458,142

(22) Filed: Aug. 12, 2014

(51) Int. Cl.
| | |
|---|---|
| *G06K 19/06* | (2006.01) |
| *G07F 7/04* | (2006.01) |
| *G06K 1/12* | (2006.01) |
| *G06Q 40/02* | (2012.01) |
| *G06Q 20/04* | (2012.01) |

(52) U.S. Cl.
CPC *G07F 7/04* (2013.01); *G06K 1/121* (2013.01); *G06K 19/06028* (2013.01); *G06K 19/06037* (2013.01); *G06Q 20/042* (2013.01); *G06Q 40/02* (2013.01)

(58) Field of Classification Search
USPC ........................................................ 235/494
See application file for complete search history.

(56) References Cited

U.S. PATENT DOCUMENTS

| | | | | | |
|---|---|---|---|---|---|
| 3,988,571 | A | * | 10/1976 | Blair | G06F 7/06 101/2 |
| 5,924,737 | A | * | 7/1999 | Schrupp | B42D 25/29 229/70 |
| 5,944,881 | A | * | 8/1999 | Mehta | B42D 25/29 106/31.15 |
| 7,974,921 | B1 | * | 7/2011 | Al Amri | G06Q 20/04 235/17 |
| 2013/0112759 | A1 | | 5/2013 | Davies et al. | |
| 2013/0226714 | A1 | | 8/2013 | Osewalt | |
| 2014/0136382 | A1 | * | 5/2014 | Orttung | G06F 21/00 705/35 |

FOREIGN PATENT DOCUMENTS

CA 2794204 A1 5/2013

* cited by examiner

*Primary Examiner* — Michael G Lee
*Assistant Examiner* — David Tardif
(74) *Attorney, Agent, or Firm* — Fish & Richardson P.C.

(57) ABSTRACT

An article for use as a negotiable instrument includes a substrate having a front side and reverse side; first machine-printed information on the substrate's front side including an account number associated with the negotiable instrument, and a unique identifier associated with the negotiable instrument, the first machine-printed information uniquely identifying the negotiable instrument; and second machine-printed information on the substrate's reverse side that corresponds to the first machine-printed information such that comparison of respective images of the substrate's front and reverse sides indicates that the images correspond to the same negotiable instrument.

29 Claims, 6 Drawing Sheets

FIG. 4 ly within the plurality of blank checks may include (a) an account number corresponding to the checking account at the financial institution, and (b) a serial number of the check. The identifier that uniquely identifies each blank check at least

NEGOTIABLE INSTRUMENT WITH DUAL-SIDED VARIABLE PRINTING

BACKGROUND

This document relates to negotiable instruments (e.g., checks) and printing thereof.

A check is a type of negotiable instrument that orders payment of money from a bank account. The person writing the check, the drawer, has a transaction banking account (often called a checking account) where their money is held. The drawer writes the various details including the monetary amount, date, and a payee on the check, and signs it, ordering their bank or financial institution, known as the drawee, to pay that person or company the amount of money stated from the checking account specified by the check.

Figure 1A:
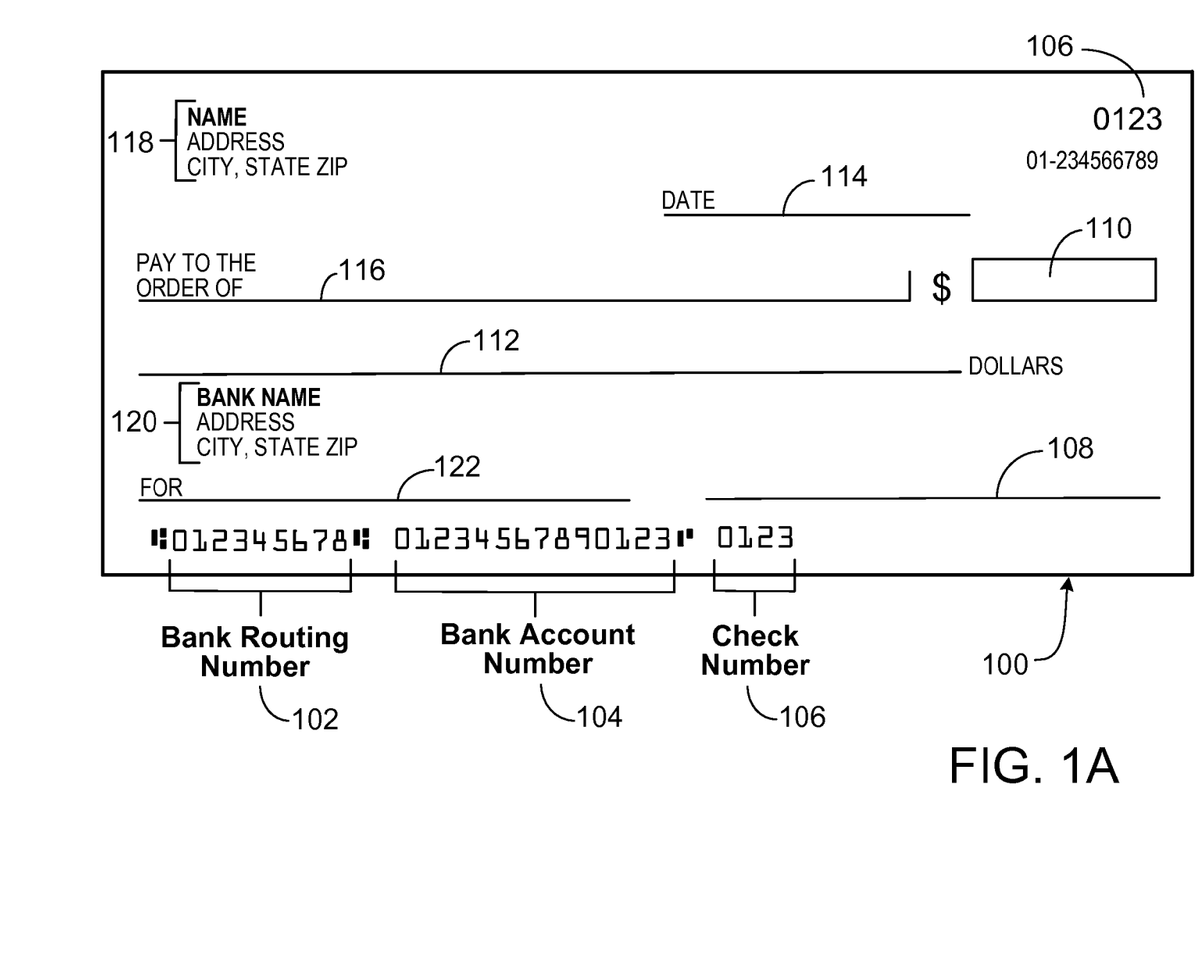
FIGS. 1A and 1B show front side and reverse side images, respectively, of a conventional blank check.
Figure 1B:
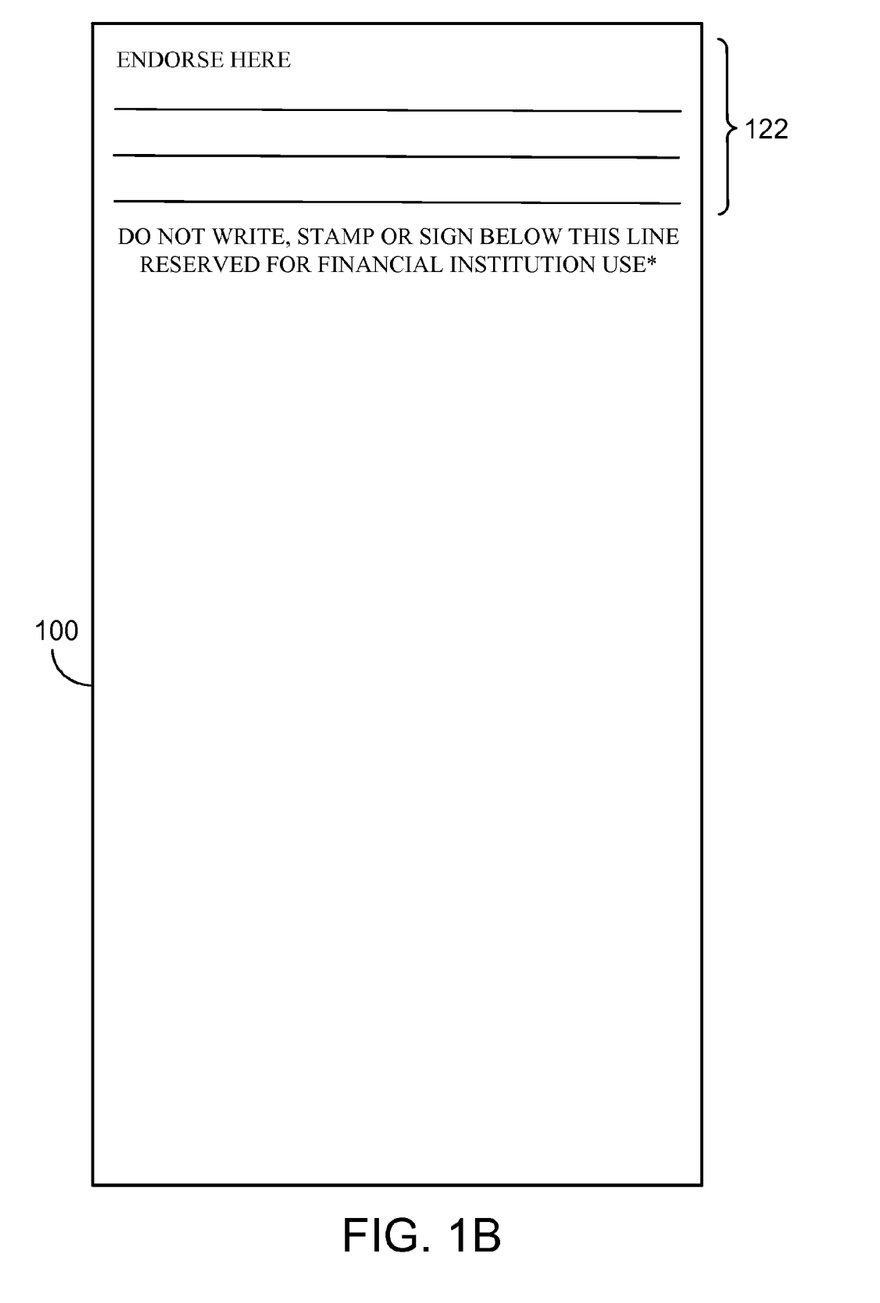

FIGS. 1A and 1B show front and back sides, respectively, of a "blank" check 100—that is, a check that has been printed, e.g., by a check printing company, but which has not yet been filled out by the drawer to specify details such as the amount or payee. As shown in FIG. 1A, the blank check includes a rectangular piece of paper check stock (or other suitable substrate) on which various information has been imprinted using suitable inks or the like. This information typically includes a bank routing number 102, which specifies a particular bank or financial institution, a bank account number 104 (unique to a particular customer or drawer), a check number 106 (typically a serial number of a particular check within a series of checks) that appears at two locations on the check as shown, a signature field 108 (for signature by the drawer), a payee field 116, a numeric monetary amount field 110, an alphabetic monetary amount field 112, and a "For" or "memo" field in which the drawer optionally may include notes, e.g., relating to the underlying transaction to which the check relates. In general, a drawer (or someone on his/her behalf) is required to fill out fields 108, 110, 112, 114, and 116 in order for the check to be legally recognized. The check 100 also may include drawer's information 118 such as the drawer's name and address, and bank information 120 such as the bank's name and address.

FIG. 1B shows the reverse side (equivalently, the "back" or "backside") of the check 100, which includes an endorsement field 122. Typically, the payee of the check 100 will provide his or her signature in the endorsement field 122 (and potentially other information such as "For Deposit Only") when presenting the check to the drawee for deposit or payment of the specified amount.

Recently, banks and other financial institutions have started providing customers with a convenient service known as "mobile check deposit" that eliminates the need for a payee to bring the physical check to his or her bank for deposit. Typically, a mobile check service operates as follows: using a mobile device, such as a smart phone, that has a camera and a special purpose software application installed and executing thereon ("the mobile app"), a payee takes photos of the front and reverse sides of a filled out check to be deposited. The mobile app then uploads the images to a server associated with the financial institution, which uses optical character recognition ("OCR") to determine the amount of the check, and to read other information on the check such as the routing number, the account number and the check number. Using this information, and subject to various check and verifications, the financial institution provisionally credits the payee's account by the amount of the check, and initiates communications within the banking network to cause the corresponding amount to be deducted from the drawer's account and transferred to the payee's account.

SUMMARY

Aspects of the systems, techniques and articles described here may include one or more of the following features.

In an implementation, an article for use as a negotiable instrument (e.g., a check) may include a substrate (e.g., paper) having a front side and reverse side; first machine-printed information on the substrate's front side including an account number associated with the negotiable instrument, and a unique identifier associated with the negotiable instrument, the first machine-printed information uniquely identifying the negotiable instrument; and second machine-printed information on the substrate's reverse side that corresponds to the first machine-printed information such that comparison of respective images of the substrate's front and reverse sides indicates that the images correspond to the same negotiable instrument. The second machine-printed information may comprise human-readable alphanumeric text that matches account number and the serial number printed on the substrate's front side. Alternatively, the second machine-printed information may include a non-alphanumeric mark, for example, encoded information such as a bar code or a ("quick response") QR-code, and/or encrypted information. The first machine-printed information may include human-readable alphanumeric text, and/or may be encrypted. The second machine-printed information may be unreadable by an unaided human eye, for example, microprint. Alternatively or in addition, the second machine-printed information may be printed in solvent sensitive ink. The unique identifier may be a serial number of the negotiable instrument. The first machine-printed information and the second machine-printed information may have different visual appearances.

In another implementation, an article may comprise a plurality of blank paper checks, each check comprising (a) a paper document having a front side and a back side; (b) first machine-printed information on the paper document's front side including (i) a payee field, (ii) a monetary amount field, (iii) a signature field, (iv) a routing number that is common to all of the plurality of blank paper checks, (v) an account number that is common to all of the plurality of blank paper checks, and (vi) a serial number that is unique to each blank paper check within the plurality of blank paper checks; and (c) second machine-printed information on the paper document's back side including (i) an endorsement field, and (ii) indicia that links each paper document's back side to the front side of the same paper document.

The indicia may include the account number and the serial number appearing on the front side of the corresponding paper document. The indicia may include non-alphanumeric information, for example, encoded information such as a bar-code or a QR-code. At least a portion of the second machine-printed information may be encrypted.

In another implementation, a method performed by data processing apparatus may include receiving user input data relating to a checking account at a financial institution; printing a front side of each of a plurality of blank checks based on the received user input data, wherein each printed check front side includes an identifier that uniquely identifies each blank check at least within the plurality of blank checks; and on a back side of each blank check, printing information corresponding to the identifier printed on the same check's front side The identifier that uniquely identifies each blank check at least within the plurality of blank checks may include (a) an account number corresponding to the checking account at the financial institution, and (b) a serial number of the check. The identifier that uniquely identifies each blank check at least within the plurality of blank checks may include a non-alphanumeric mark such as a barcode or a QR-code. The identifier printed on the check's back side may include information that is encoded or encrypted or both.

In another implementation, a computer-implemented method performed by data processing apparatus comprises receiving user input data relating to a checking account; printing a front side of each of a plurality of blank checks based on the received user input data, wherein each printed check front side includes indicia uniquely identifying each printed check; and on a backside of each blank check, printing the same unique indicia identifying each printed check as is on the front side of each printed check.

In another implementation, a computer-implemented method of detecting check fraud, the method comprises receiving from a remote device (a) two digital images of a physical negotiable instrument including a front side image and a back side image, and (b) a request to deposit the negotiable instrument in a specified account associated with a financial institution; inspecting each of the front side image and the back side image to determine whether each image includes information that uniquely identifies the same physical negotiable instrument; and selectively deciding whether to deposit an amount specified by the negotiable instrument into the specified account based on a result of the inspection.

Selectively deciding whether to deposit the amount specified by the negotiable instrument into the specified account based on a result of the inspection comprises deciding to deposit the amount specified by the negotiable instrument into the specified account if the inspection determines that each image identifies the same physical negotiable instrument. Alternatively, selectively deciding whether to deposit the amount specified by the negotiable instrument into the specified account based on a result of the inspection comprises deciding to refuse deposit of the amount specified by the negotiable instrument into the specified account if the inspection determines that each image does not identify the same physical negotiable instrument.

In another implementation, a check printing system comprises a front-end server configured to receive user input specifying account information associated with a financial institution; a production server configured to process the received user input to generate a print file describing a plurality of blank paper checks to be printed, each blank check having a front side and a back side, the print file specifying for each blank check to be printed (a) first machine-printed information for printing on the check's front side including an identifier that is unique to each blank paper check within the plurality of blank paper check, and (b) second machine-printed information for printing on the check's back side including information that uniquely links the check's back side to the same check's front side; and a printer configured to receive the print file, and for each blank check, to print the first machine-printed information on the check's front side, and to print the second machine-printed information of the check's back side.

The identifier that is unique to each blank paper check with the plurality of blank paper checks may include an account number that is common to all of the blank paper checks and serial number of the check within the plurality of blank paper checks. The first machine-printed information and the second-machine printed information on each blank paper check may have substantially the same visual appearance. Alternatively, the first machine-printed information and the second-machine printed information on each blank paper check may have different visual appearances but represent common information.

Among others, the foregoing features potentially provide various advantages. For example, by printing a unique identifier on the front and reverse sides of a physical check, the problem of mobile check deposit fraud, arising from a bad actor's attempting to submit check front and back images that correspond to different physical checks, can be minimized.

The foregoing and other features, aspects, and potential advantages will become apparent from the description, the figures, and the claims.

DETAILED DESCRIPTION

The present inventors recognized that conventional checks could be used to commit fraud in the context of mobile check deposits. This is because a bad actor seeking to commit fraud need not present the physical check to the depositing institution, but rather need only transmit separate images of a check's front side and a check's reverse side, but not necessarily images that correspond to the same physical check. Consequently, because the reverse sides of conventional checks, for relevant purposes, essentially appear all the same, there is no way for the depositing institution to determine whether a received check reverse side image actually corresponds to the same physical, paper check as the received front side image. As a result, a bad actor is able to reuse a single check reverse side image (e.g., which has been endorsed) for multiple different check front side images, even though the physical checks corresponding to those front side images have not in fact been endorsed.

Based on this recognition, the present inventors developed techniques for performing dual-sided printing on checks or other negotiable instruments such that a reverse side image of a check includes one or more indicia or items of information that can be used to determine whether the received reverse side image corresponds to the same physical check as the received front side image. Among other advantages, this variable dual-sided printing enables check printers to print checks that are less susceptible to mobile deposit check fraud.

Figure 2A:
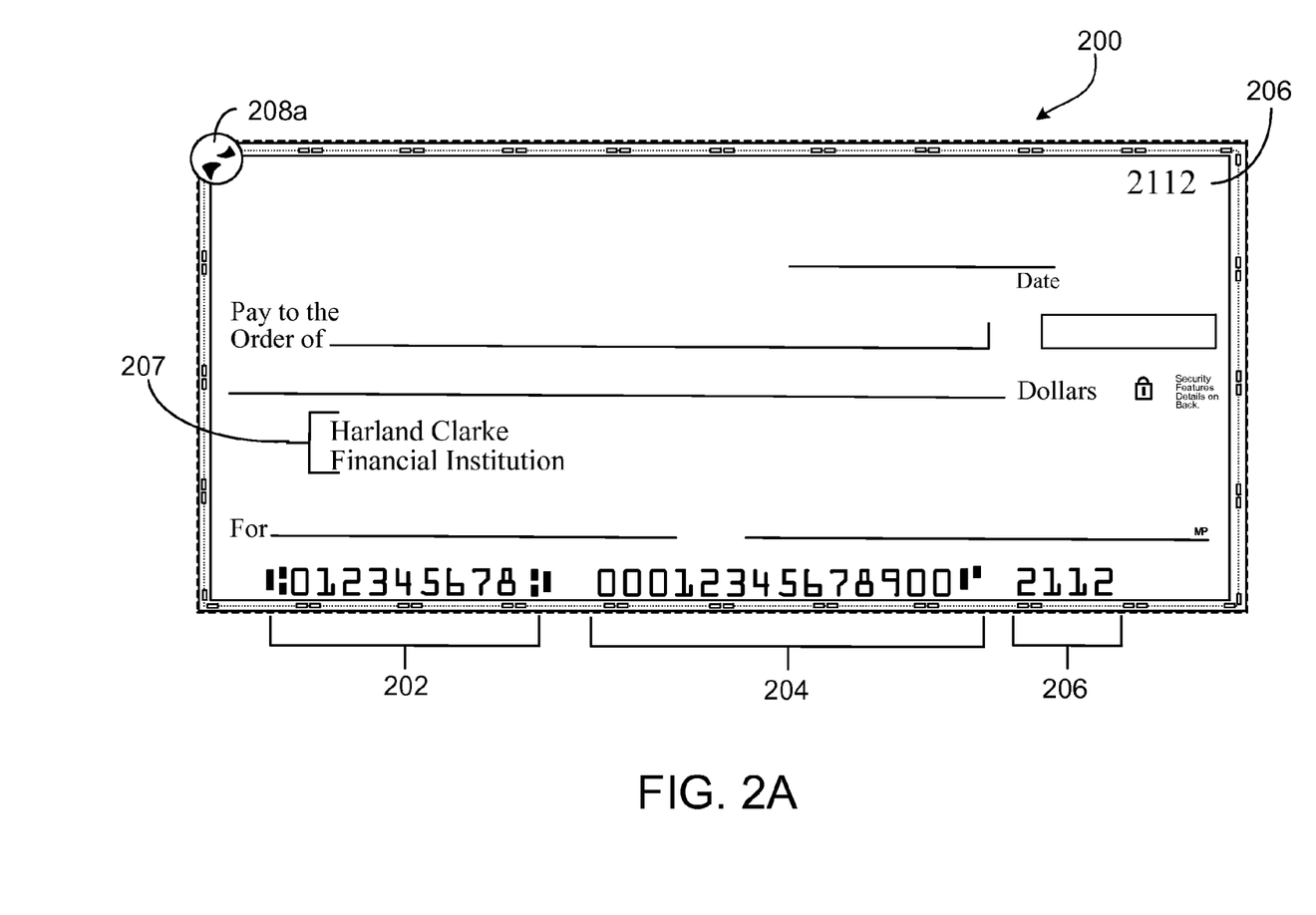
FIGS. 2A and 2B show front side and reverse side images, respectively, of an implementation of a variable, dual-sided printed check.
Figure 2B:
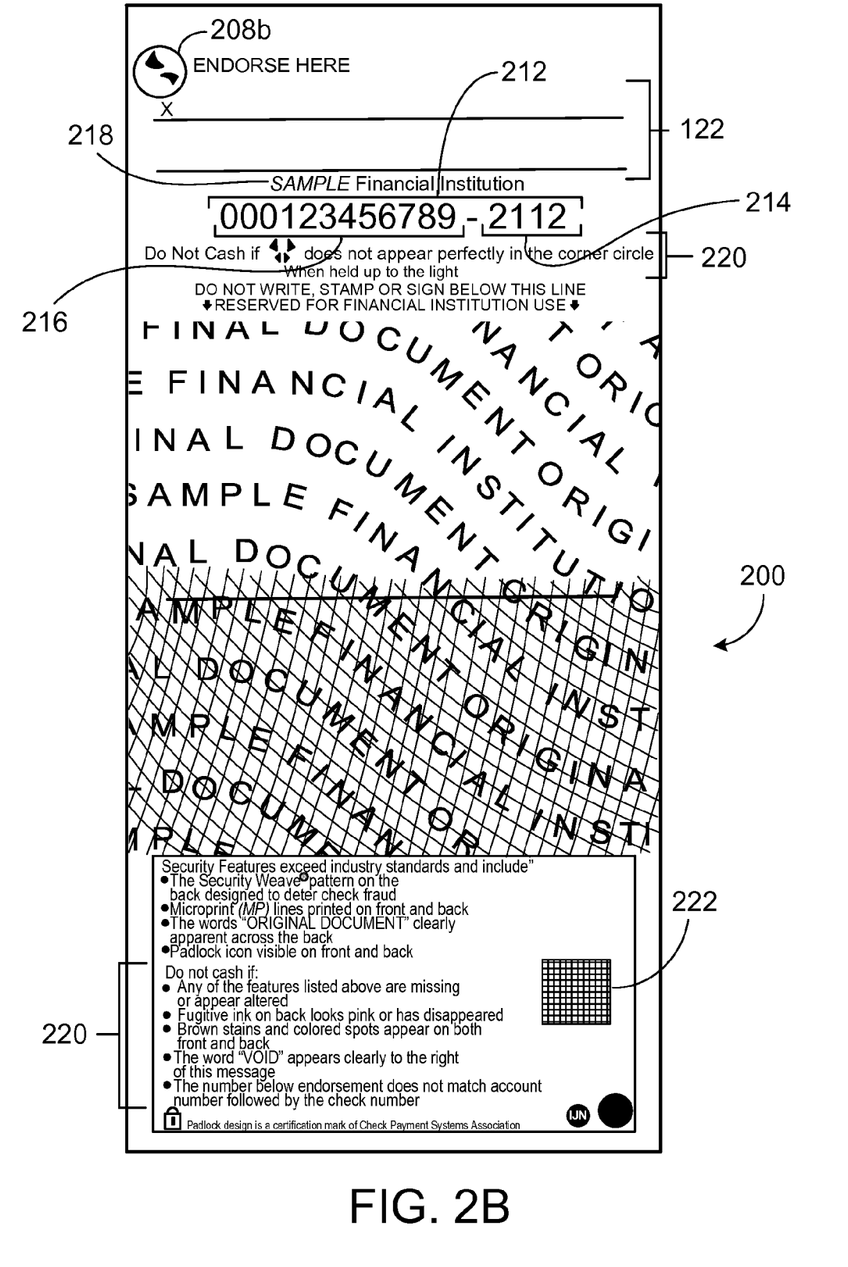

FIGS. 2A and 2B depict an implementation of a dual-sided, printed check 200 having a front side as shown in FIG. 2A that includes a routing number 202, an account number 204, and a check number 206, such as found on conventional checks. The check's front side optionally also can include an indicium 208, for example, an emblem or logo associated with the checking printing company, the drawer, or the drawer's bank.

FIG. 2B shows the reverse side of the same check 200 depicted in FIG. 2A. As shown, the check's reverse side includes not only the standard endorsement field 122, but also includes one or more indicia that enables the check's reverse side shown in FIG. 2B to be uniquely identified as corresponding to the same check's front side shown in FIG. 2A. An example of such indicia is indicated by unique identifier 212, which corresponds to a numeric string formed, in this example, of 18 digits, separated by a dash. The first 14 digits ("00012345678900"), indicated by reference numeral 216 are the same as the account number 204 shown on the check's front side in FIG. 2A. The last four digits ("2112"), indicated by reference numeral 214, are the same as the check number 206 shown on the check's front side in FIG. 2A.

Consequently, if in the context of a mobile check deposit, a depositing bank received images of a check's front side and reverse side as shown in FIGS. 2A and 2B, respectively, an analysis and comparison of those images would reveal that they corresponded to the same physical check because the digits 216 and digits 214 on the check's reverse side match the account number 204 and check number 206, respectively, on the check's front side. In contrast, if the depositing bank received a reverse side image as shown in FIG. 2B along with a front side image having either an account number 204 or a check number 206 that did not match digits 216 and digits 214, respectively, then a comparison of those two images would reveal that they did not correspond to the same physical check, thereby suggesting fraudulent activity. In that regard, as shown in FIG. 2B, the check 200 further includes "Do Not Cash" instructions 220 explaining fact-specific circumstances under which the check should not be cashed, for example, "Do not cash if: . . . The number below the endorsement does not match account number followed by check number."

Other indicia may be printed on the check's front and reverse sides that help to establish that images of a check's front and reverse sides correspond to the same physical check. For example, the name of the check printer or financial institution associated with the check can be printed on both sides of the check as shown at 207 and 218 in FIGS. 2A and 2B, respectively. Similarly, an emblem or logo (208a in FIG. 2a; 208a in FIG. 2B) can be printed on both sides of the check. In this example, the emblems 208a and 208b each represents a portion of a corporate logo (a stylized "H") that are printed in registration with each other on respective front and back sides of the check 200. When the check 200, which is printed on a semi-translucent substrate, is held up to a light source, both portions of the logo become visible, and collectively form the complete corporate logo. Although such indicia do not necessarily uniquely identify, in a global sense, the check front and reverse side images as corresponding to the same physical check, they add to the check holder's confidence that the front and back images correspond to the same physical check, and thus tend to make it more difficult for a check forger to reuse an endorsed check reverse side image with multiple different check front side images.

Moreover, to uniquely identify the check's front and reverse side images as corresponding to the same physical check, the indicia appearing on the front and back of the physical check do not necessarily have to be identical, or even similar, in visual appearance. For example, a front side of a check could include information that uniquely identifies the check (e.g., by the account number 204 coupled with the check number 206) while the reverse side of the same check could include essentially the same unique information but in a different format or arrangement. For example, the reverse side of the check could include the check's account number and check number encoded in a bar code or a quick response ("QR") code or a similar encoded mark 222. Similarly, the reverse side of the check optionally may have the check's account number and check number printed thereon in ink that is invisible to the human eye under normal conditions (e.g., micro-printing or invisible ink), but which is captured when the front and/or reverse side images of the check are generated. Other specialty inks may be used, for example, fugitive inks such as solvent sensitive ink. Using solvent sensitive ink may be beneficial in a situation, for example, where a bad actor attempts to "wash" a check, that is, use a solvent to erase details from a filled-out check in order to allow it to be re-written. So if the variable, unique information is printed on the check's reverse side in solvent sensitive ink, then the variable, unique information will also be washed away if the bad actor washes the check. As a result, the check will no longer include the variable, unique information on its back side, thereby indicating fraudulent activity.

In general, essentially any variable information (i.e., information that varies from check-to-check, and which uniquely identifies the check) can be printed on the reverse side (i.e., endorsement side) of a check or other negotiable instrument provided that printed information sufficiently links the front and reverse sides of the physical check such that a depositing bank can determine, through comparison of front and reverse side images, whether the compared images correspond to the same physical document. Such printed information need not be alphanumeric but rather can be, or include, non-alphanumeric graphic marks, images, and/or codes.

Moreover, the variable printed content such as the unique identifier 212 or encoded mark 222 could be encrypted, e.g., by using public/private key encryption or other encryption schemes. Encrypting the variable printed content would provide the benefit, among others, of making it extremely difficult, if not virtually impossible, for a bad actor to forge a check's reverse side to make it match the corresponding information on the opposite side of a different check. For example, without encryption, a bad actor in theory could forge a check's reverse side (or modify a check's reverse side image digitally using photo editing software) to include the string of digits 212 shown in FIG. 2B to cause the check's reverse side image to match the account and check number information on the check's front side image, thereby potentially defeating the protections provided by the variable dual-sided printed content techniques described here. However, if each check's reverse side is printed with information that, for example, corresponds to an encrypted value of the check's account number and check number appearing on the front side, the forger—not knowing the encryption key—would not know how to modify the check's back image to cause it to match the information on the front image that uniquely identifies the check.

Figure 3:
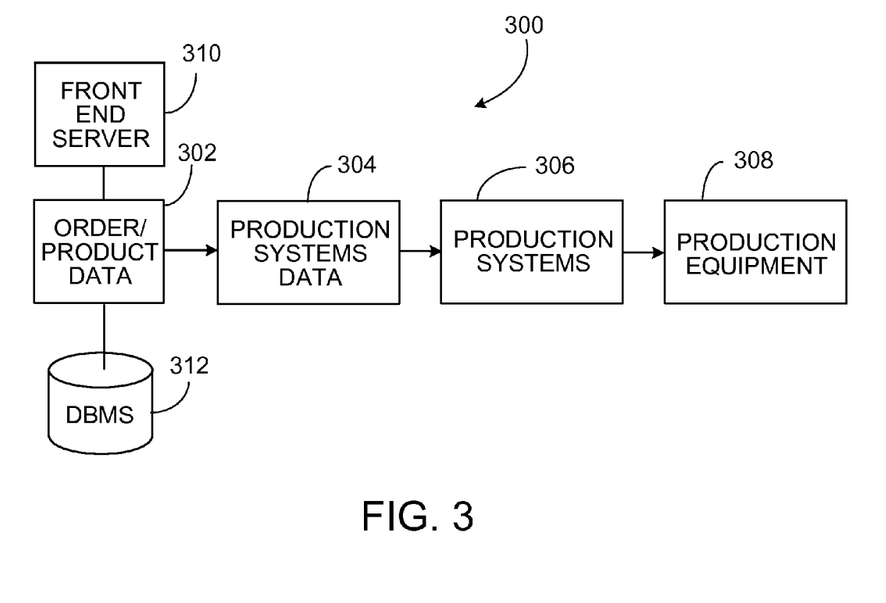
FIG. 3 is a workflow diagram for variable, dual-sided printing of blank checks.

FIG. 3 is a workflow diagram 300 for variable, dual-sided printing of blank checks. In general, variable, dual-sided printing is accomplished using a dual pass method in which blank check stock is first passed through the system to print a first side of a blank check (e.g., a front side), and then is passed again to print the other side of the blank check (e.g., a reverse side). Alternatively, the front and back sides could be printed in the opposite order, or could be printed simultaneously, or at least partially so, provided dual-sided production equipment was used.

At block 302, the system 300 receives the check order or product data, for example, a check type (e.g., business or personal), along with any or all of the various items of information identified in FIG. 1A. This product information may be received either from a front-end system 310 that interfaces with customers to receive orders for blank checks, and/or from a database system 312 that stores product information relating to previous orders (e.g., when a known customer has re-ordered checks).

The order/product data is passed to block 304, which processes the order/product data to generate production systems data, which includes an interpretable print file that describes the checks to be printed. Next, the print file is passed at block 306 to the production systems, which for example, can be implemented using a Canon Oce' PRIMSA™ workflow management system. Among other functionality, the production systems include a print file interpreter ("PFI"), which interprets the print file received from block 304 and converts it to a format understandable by the production equipment. Next, the information resulting from interpretation of the print file is passed to the production equipment at block 308, that is, the equipment that actually prints and otherwise produces the physical checks. The production equipment may include, for example, a Canon JetStream® printer and finishing equipment manufactured by EMT International, Inc.

Figure 4:
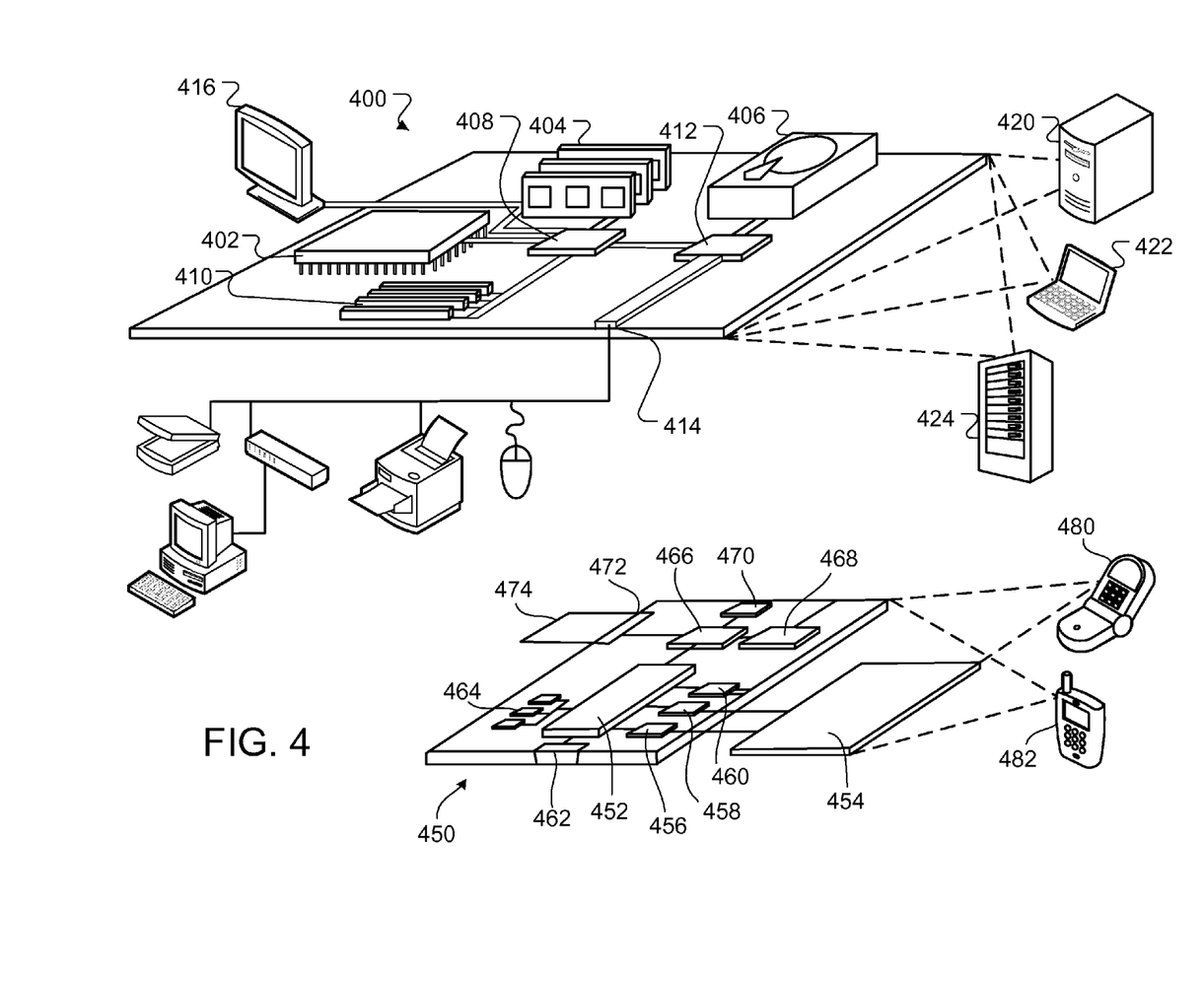
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high speed interface 408 connecting to memory 404 and high speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high speed controller 408 is coupled to memory 404, display 416 (e.g., through a graphics processor or accelerator), and to high speed expansion ports 410, which may accept various expansion cards (not shown). In the implementation, low speed controller 412 is coupled to storage device 406 and low speed expansion port 414. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 402 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. An article for use as a negotiable instrument, the article comprising:
    a substrate having a front side and reverse side;
    first machine-printed information on the substrate's front side including an account number associated with the negotiable instrument, and a unique identifier associated with the negotiable instrument, the first machine-printed information uniquely identifying the negotiable instrument; and second machine-printed information, separate from the first machine-printed information and printed directly on the substrate's reverse side that corresponds to the first machine-printed information such that comparison of respective images of the substrate's front and reverse sides uniquely identifies the images as corresponding to the same negotiable instrument;

wherein the article lacks machine-printed or hand-printed information that would give it legal effect as a negotiable instrument.

2. The article of claim 1 wherein the second machine-printed information comprises human-readable alphanumeric text that matches the account number and the unique identifier printed on the substrate's front side.

3. The article of claim 1 wherein the second machine-printed information comprises a non-alphanumeric mark.

4. The article of claim 3 wherein the first machine-printed information comprises human-readable alphanumeric text.

5. The article of claim 3 wherein the non-alphanumeric mark comprises encoded information.

6. The article of claim 5 wherein the encoded information comprises a bar code or a QR-code.

7. The article of claim 1 wherein the second machine-printed information is unreadable by an unaided human eye.

8. The article of claim 7 wherein the second machine-printed information comprises microprint.

9. The article of claim 1 wherein the second machine-printed information is encrypted.

10. The article of claim 1 wherein the second machine-printed information comprises solvent sensitive ink.

11. The article of claim 1 wherein the unique identifier comprises a serial number of the negotiable instrument.

12. The article of claim 1 where the first machine-printed information and the second machine-printed information have different visual appearances.

13. The article of claim 1 wherein the negotiable instrument comprises a blank paper check, and further comprising:
a plurality of blank paper checks, each check comprising:
(a) a paper document having a front side and a back side;
(b) first machine-printed information on the paper document's front side including (i) a payee field, (ii) a monetary amount field, (iii) a signature field, (iv) a routing number that is common to all of the plurality of blank paper checks, (v) an account number that is common to all of the plurality of blank paper checks, and (vi) a serial number that is unique to each blank paper check within the plurality of blank paper checks;
(c) second machine-printed information on the paper document's back side including (i) an endorsement field, and (ii) indicia that links each paper document's back side to the front side of the same paper document.

14. The article of claim 13 wherein the indicia comprises the account number and the serial number appearing on the front side of the corresponding paper document.

15. The article of claim 13 wherein the indicia comprises non-alphanumeric information.

16. The article of claim 15 wherein the non-alphanumeric information comprises encoded information.

17. The article of claim 16 wherein the encoded information comprises a bar code or a QR-code.

18. The article of claim 13 wherein at least a portion of the second machine-printed information is encrypted.

19. A method performed by data processing apparatus, the method comprising:
receiving user input data relating to a checking account at a financial institution;
printing first machine-printed information on a front side of each of a plurality of blank checks based on the received user input data, wherein each printed check front side includes an identifier that uniquely identifies each blank check at least within the plurality of blank checks; and
on a back side of each blank check, printing second machine-printed information, separate from the first machine-printed information, and corresponding to the identifier printed on the same blank check's front side, wherein the first machine-printed information and the second machine-printed information are such that a comparison of respective images of the same blank check's front and back sides uniquely identifies the images as corresponding to the same blank check;
wherein each blank check lacks machine-printed or hand-printed information that would give it legal effect as a negotiable instrument.

20. The method of claim 19 wherein the identifier that uniquely identifies each blank check at least within the plurality of blank checks comprises (a) an account number corresponding to the checking account at the financial institution, and (b) a serial number of the check.

21. The method of claim 19 wherein the identifier that uniquely identifies each blank check at least within the plurality of blank checks comprises a non-alphanumeric mark.

22. The method of claim 21 wherein the non-alphanumeric mark comprises a barcode or a QR-code.

23. The method of claim 19 wherein the identifier printed on the check's back side comprises information that is encoded or encrypted or both.

24. A computer-implemented method of detecting check fraud, the method comprising:
at a financial institution at a first geographical location, receiving from a remote device at a second geographical location different from the first geographical location, (a) two digital images of a physical negotiable instrument including a front side image and a back side image, and (b) a request to deposit the negotiable instrument in a specified account associated with the financial institution, wherein, due at least in part to a physical distance between the first geographical location and the second geographical location, the financial institution has access only to the received two digital images of the physical negotiable instrument and not to the physical negotiable instrument itself;
at the financial institution, inspecting each of the front side image and the back side image to determine whether each of the two images includes machine printed information that uniquely identifies the same physical negotiable instrument; and
at the financial institution, selectively depositing an amount specified by the negotiable instrument into the specified account only if the inspection determines that each of the two images includes machine printed information that uniquely identifies the same physical negotiable instrument.

25. The method of claim 24 wherein selectively depositing the amount specified by the negotiable instrument into the specified account comprises either (a) deciding to deposit the amount specified by the negotiable instrument into the specified account if the inspection determines that each image identifies the same physical negotiable instrument, or (b)

deciding to refuse deposit of the amount specified by the negotiable instrument into the specified account if the inspection determines that each image does not identify the same physical negotiable instrument.

26. A check printing system comprising:
- a front-end server configured to receive user input specifying account information associated with a financial institution;
- a production server configured to process the received user input to generate a print file describing a plurality of blank paper checks to be printed, each blank check having a front side and a back side, the print file specifying for each blank check to be printed (a) first machine-printed information for printing directly on the check's front side including an identifier that is unique to each blank paper check within the plurality of blank paper check, and (b) second machine-printed information, separate from the first machine-printed information, for printing directly on the check's back side including information that uniquely links the check's back side to the same check's front side; and
- a printer configured to receive the print file, and for each blank check, to directly print the first machine-printed information on the check's front side, and to separately and directly print the second machine-printed information of the check's back side;
- wherein each blank check, when printed, lacks machine-printed or hand-printed information that would give it legal effect as a negotiable instrument.

27. The system of claim 26 wherein the identifier that is unique to each blank paper check with the plurality of blank paper checks comprises an account number that is common to all of the blank paper checks and a serial number of the check within the plurality of blank paper checks.

28. The system of claim 26 wherein the first machine-printed information and the second-machine printed information on each blank paper check have substantially the same visual appearance.

29. The system of claim 26 wherein the first machine-printed information and the second-machine printed information on each blank paper check have different visual appearances but represent common information.

* * * * *